(12) United States Patent
Harding et al.

(10) Patent No.: US 7,787,591 B2
(45) Date of Patent: Aug. 31, 2010

(54) PRIMARY COLLIMATOR AND SYSTEMS FOR X-RAY DIFFRACTION IMAGING, AND METHOD FOR FABRICATING A PRIMARY COLLIMATOR

(75) Inventors: Geoffrey Harding, Hamburg (DE); Helmut Rudolf Strecker, Hamburg (DE); Johannes Delfs, Hamburg (DE)

(73) Assignee: Morpho Detection, Inc., Newark, CA (US)

( * ) Notice: Subject to any disclaimer, the term of this patent is extended or adjusted under 35 U.S.C. 154(b) by 53 days.

(21) Appl. No.: 12/325,527

(22) Filed: Dec. 1, 2008

(65) Prior Publication Data

US 2010/0135462 A1 Jun. 3, 2010

(51) Int. Cl.
*G01N 23/20* (2006.01)
*G21K 1/02* (2006.01)
(52) U.S. Cl. .................................. 378/87; 378/149
(58) Field of Classification Search .................. 378/149, 378/87
See application file for complete search history.

(56) References Cited

U.S. PATENT DOCUMENTS

| 5,859,893 | A | 1/1999 | Moorman et al. |
| 7,092,485 | B2 | 8/2006 | Kravis |
| 7,463,720 | B2 | 12/2008 | Harding et al. |
| 7,463,721 | B2 | 12/2008 | Harding et al. |
| 7,496,181 | B2 * | 2/2009 | Mazin et al. ................. 378/149 |
| 2007/0133749 | A1 * | 6/2007 | Mazin et al. ................. 378/147 |
| 2008/0013684 | A1 | 1/2008 | Harding |
| 2008/0031415 | A1 | 2/2008 | Harding |
| 2008/0063146 | A1 | 3/2008 | Harding et al. |
| 2009/0003514 | A1 | 1/2009 | Edic et al. |

OTHER PUBLICATIONS

U.S. Appl. No. 12/263,023, filed Oct. 31, 2008 (Harding).
U.S. Appl. No. 12/263,074, filed Oct. 31, 2008 (Harding et al.)

* cited by examiner

*Primary Examiner*—Edward J Glick
*Assistant Examiner*—Thomas R Artman
(74) *Attorney, Agent, or Firm*—Armstrong Teasdale LLP (57) ABSTRACT

A primary collimator for a multiple inverse fan beam x-ray diffraction imaging (MIFB XDI) system. The MIFB XDI system includes a multi-focus x-ray source (MFXS) defining a plurality of focus points arranged along a length of the MFXS. Each focus point is sequentially activated to emit an x-ray fan beam including a plurality of primary beams each directed to a corresponding convergence point. The primary collimator includes a first diaphragm configured to be positioned with respect to the MFXS. The first diaphragm defines a plurality of first channels through a thickness of the first diaphragm. Each first channel is aligned with a corresponding focus point and configured to transmit the x-ray fan beam. A second diaphragm is positioned with respect to the first diaphragm and defines a plurality of second channels through a thickness of the second diaphragm. Each second channel is axially aligned with a corresponding first channel.

20 Claims, 4 Drawing Sheets

PRIMARY COLLIMATOR AND SYSTEMS FOR X-RAY DIFFRACTION IMAGING, AND METHOD FOR FABRICATING A PRIMARY COLLIMATOR

BACKGROUND OF THE INVENTION

1. Field of the Invention

The embodiments described herein relate to a multi-detector inverse fan beam x-ray diffraction imaging (MIFB XDI) system and, more particularly, to a primary collimator suitable for use with an MIFB XDI system.

2. Description of Prior/Related Art

Known security detection systems are used at travel checkpoints to inspect carry-on and/or checked bags for concealed weapons, narcotics, and/or explosives. At least some known security detection systems include x-ray imaging systems. In an x-ray imaging system, an x-ray source transmits x-rays through a container, for example a suitcase, towards a detector, and the detector output is processed to identify one or more objects and/or one or more materials in the container.

At least some known security detection systems include a multi-detector inverse fan beam x-ray diffraction imaging (MIFB XDI) system. MIFB XDI systems use an inverse fan-beam geometry (a large source and a small detector) and a multi-focus x-ray source (MFXS). MIFB XDI systems also utilize a plurality of detectors to increase an x-ray diffraction imaging (XDI) signal and, thus, reduce measurement time. The MIFB XDI system has a greater photon efficiency, i.e., a higher signal-to-noise ratio, than an inverse fan beam with conventional systems having a single detector. Further, the MIFB XDI system allows an analysis of object material from numerous projection directions, and is compatible with a quasi-3D tomosynthesis by synergistically using the MFXS for x-ray diffraction imaging (XDI) and projection imaging.

It is desirable to manufacture or fabricate a primary collimator suitable for use with an MIFB XDI system that is mechanically and operationally simpler, as well as less expensive to fabricate and more precise than conventional primary collimators.

BRIEF DESCRIPTION OF THE INVENTION

In one aspect, a primary collimator for a multiple inverse fan beam x-ray diffraction imaging (MIFB XDI) system is provided. The MIFB XDI system includes a multi-focus x-ray source (MFXS) defining a plurality of focus points arranged along a length of the MFXS collinear with a y-axis of the MIFB XDI system. Each focus point of the plurality of focus points is sequentially activated to emit an x-ray fan beam including a plurality of primary beams each directed to a corresponding convergence point of a plurality of convergence points positioned along a line parallel to the y-axis at a coordinate X=L. The primary collimator includes a first diaphragm configured to be positioned with respect to the MFXS. The first diaphragm defines a plurality of first channels through a thickness of the first diaphragm. Each first channel of the plurality of first channels is aligned with a corresponding focus point of the plurality of focus points and configured to transmit the x-ray fan beam. A second diaphragm is positioned with respect to the first diaphragm and defines a plurality of second channels through a thickness of the second diaphragm. Each second channel of the plurality of second channels is axially aligned with a corresponding first channel of the plurality of first channels.

In another aspect, a multiple inverse fan beam x-ray diffraction imaging (MIFB XDI) system is provided. The MIFB XDI system includes a multi-focus x-ray source (MFXS) including an anode and a plurality of focus points arranged along a length of the anode collinear with a y-axis of the MFXS. Each focus point of the plurality of focus points is sequentially activated to emit an x-ray fan beam including a plurality of primary beams. A multi-angle primary collimator (MAPC) is configured to select the plurality of primary beams each directed to a corresponding convergence point of a plurality of convergence points positioned along a line parallel to the y-axis at a coordinate X=L with one focus point of the plurality of focus points activated.

In another aspect, a method for fabricating a primary collimator for a multiple inverse fan beam x-ray diffraction imaging (MIFB XDI) system is provided. The MIFB XDI system includes a multi-focus x-ray source (MFXS) defining a plurality of focus points arranged along a length of the MFXS collinear with a y-axis of the MIFB XDI system. Each focus point of the plurality of focus points is sequentially activated to emit an x-ray fan beam including a plurality of primary beams each directed to a corresponding convergence point of a plurality of convergence points positioned along a line parallel to the y-axis at a coordinate X=L. The method includes positioning a first diaphragm with respect to the MFXS. The first diaphragm defines a plurality of first channels through a thickness of the first diaphragm. Each first channel of the plurality of first channels is aligned with a corresponding focus point of the plurality of focus points and configured to transmit the x-ray fan beam. A second diaphragm is positioned with respect to the first diaphragm. The second diaphragm defines a plurality of second channels through a thickness of the second diaphragm. Each second channel of the plurality of second channels is axially aligned with a corresponding first channel of the plurality of first channels.

BRIEF DESCRIPTION OF THE DRAWINGS

FIGS. 1-4 show exemplary embodiments of the systems and method described herein.

DETAILED DESCRIPTION OF THE INVENTION

The embodiments described herein provide a multi-detector inverse fan beam x-ray diffraction imaging (MIFB XDI) system configured to emit several pencil primary x-ray beams from each focus point on a multi-focus x-ray source (MFXS). The MIFB XDI system has greater photon efficiency, i.e., a higher signal-to-noise ratio, than an inverse fan beam with conventional systems having a single detector. Further, the MIFB XDI system allows an analysis of object material from numerous projection directions and is compatible with a quasi-3D tomosynthesis system by synergistically using the MFXS for x-ray diffraction imaging (XDI) and projection imaging.

The MIFB XDI system includes a primary collimator that only transmits x-rays directed to a finite number of convergence points, such as 13 convergence points. The primary collimator has a first or near-focus diaphragm defining a plurality of first channels through the near-focus diaphragm and a cooperating second or near-object diaphragm defining a plurality of second channels through the near-object diaphragm, each of which are axially aligned with a corresponding first channel. Because the primary collimator includes only two diaphragms, the primary collimator is mechanically and operationally simpler, as well as less expensive to fabricate and more precise than conventional primary collimators. In one embodiment, the near focus diaphragm selects from a cone of radiation emitted by each focus point on the MFXS an angular range sufficient to generate a multiple fan beam and the near-object diaphragm satisfies a simple replicacy condition.

While described in terms of detecting contraband including, without limitation, weapons, explosives, and/or narcotics, within checked or carry-on baggage, the embodiments described herein may be used for any suitable security detection or other x-ray diffraction imaging application, including applications in the plastics recycling, pharmaceutical and non-destructive testing industries. Further, angles and/or dimensions shown in the accompanying figures may not be to scale, and may be exaggerated for clarity.

Figure 1:
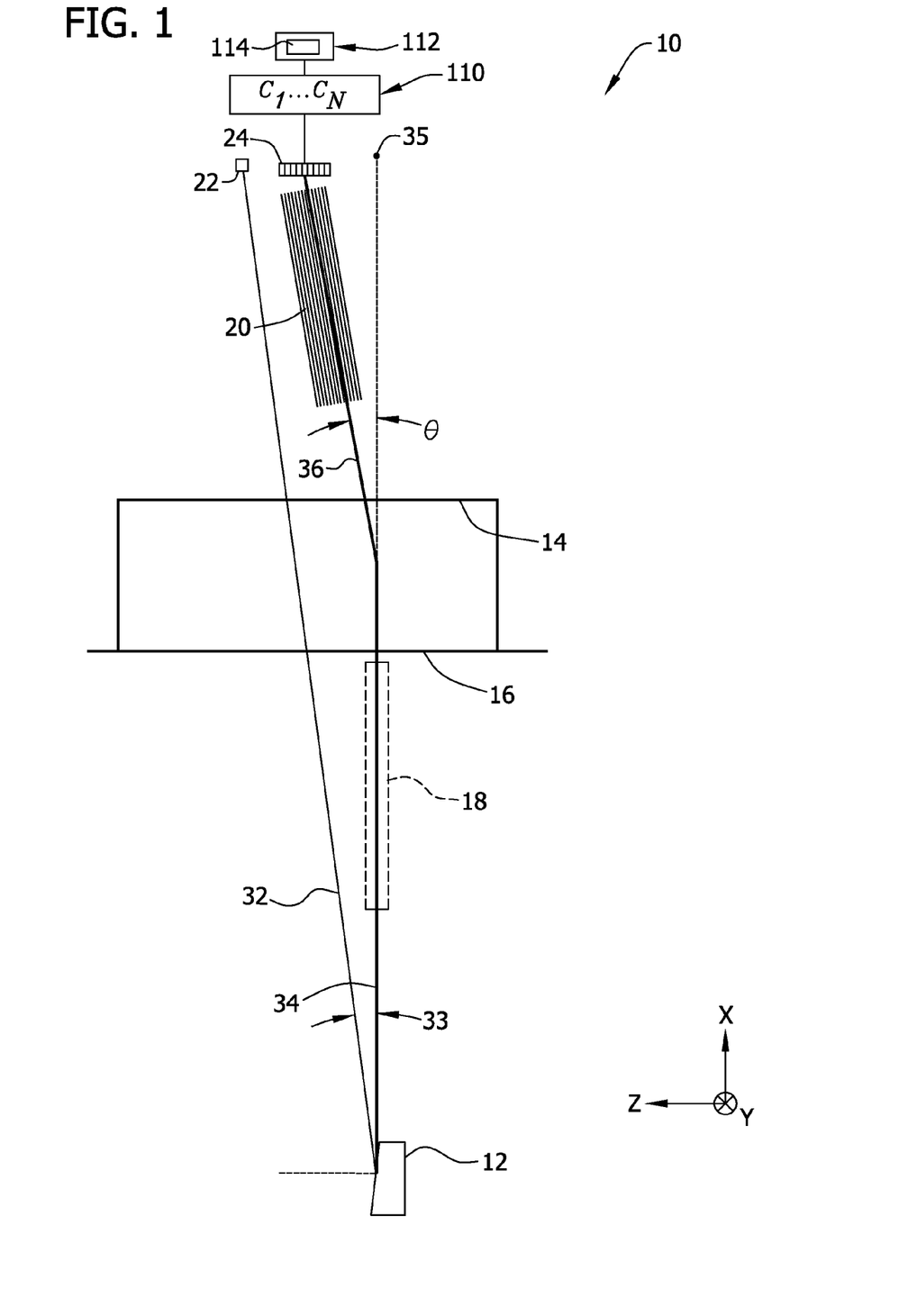
FIG. 1 is a schematic view, in an X-Z plane, of an exemplary security detection system.

FIG. 1 is a schematic view, in an X-Z plane, of an exemplary security detection system 10. In the exemplary embodiment, security detection system 10 is a multi-detector inverse fan beam x-ray diffraction imaging (MIFB XDI) system that includes a multi-focus x-ray source (MFXS) 12, an examination area 14, a support 16 configured to support an object, a multi-angle primary collimator (MAPC) 18, and a secondary collimator 20. Security detection system 10 also includes two types of detectors, an array of transmission detectors 22 and a plurality of discrete coherent x-ray scatter detectors 24. Transmission detectors 22 are offset in a z-axis direction from scatter detectors 24.

In the exemplary embodiment, MFXS 12 is capable of emitting x-ray radiation sequentially from a plurality of focus points, as described below, distributed along MFXS 12 in a direction substantially parallel to a y-axis perpendicular to the z-axis. In the exemplary embodiment, MFXS 12 has approximately 40 focus points. In an alternative embodiment, MFXS 12 has approximately 100 focus points. In further alternative embodiments, MFXS 12 includes any suitable number of focus points that will allow security detection system 10 to function as described herein.

Further, in the exemplary embodiment, MFXS 12 is located on a lower support surface, such as at or near a floor, while transmission detectors 22 and scatter detectors 24 are located on an upper support structure, such as at or near a ceiling. In an alternative embodiment, MFXS 12 is located on an upper support structure, such as at or near a ceiling, while transmission detectors 22 and scatter detectors 24 are located on a lower support surface, such as at or near a floor. Further, in the exemplary embodiment, MFXS 12, transmission detectors 22 and scatter detectors 24 are stationary, support 16 is a conveyor belt capable of movement backward and forward in a direction substantially parallel to the z-axis, and examination area 14 is a baggage tunnel through which the conveyor belt moves. In an alternative embodiment, MFXS 12, transmission detectors 22 and scatter detectors 24 are capable of coordinated movement at least in a direction substantially parallel to the z-axis, and support 16 is stationary. In certain alternative embodiments, MFXS 12, transmission detectors 22, scatter detectors 24 and support 16 are all capable of movement.

In the exemplary embodiment, MFXS 12 is capable of emitting an x-ray fan beam 32 from each focus point of MFXS 12. Each fan beam 32 lies substantially in a plane at an angle 33 relative to a vertical x-axis perpendicular to the z-axis and the y-axis. Each fan beam 32 is directed at transmission detectors 22. In the exemplary embodiment, angle 33 is approximately ten degrees. In an alternative embodiment, angle 33 is approximately fifteen degrees. In further alternative embodiments, angle 33 is any suitable angle that will allow security detection system 10 to function as described herein.

In addition, MFXS 12 is capable of emitting, through MAPC 18, a set of x-ray pencil beams 34, from each focus point of MFXS 12. Each pencil beam 34 is directed at a corresponding convergence point 35 which lies in the same X-Y plane as MFXS 12. Further, each convergence point 35 is positioned at the same X-coordinate value, but at different Y-coordinate values. Because each pencil beam 34 is emitted in the same X-Y plane, only one pencil beam 34 (and only one convergence point 35) is visible in the X-Z cross-section view of FIG. 1.

A portion of the x-ray radiation from each pencil beam 34 typically is scattered in various directions upon contact with a container (not shown) in examination area 14. Secondary collimator 20 is configured to facilitate ensuring that a portion of scattered radiation 36 arriving at each scatter detector 24 has a constant scatter angle θ with respect to the corresponding pencil beam 34 from which scattered radiation 36 originated. In certain embodiments, scatter angle θ is approximately 0.04 radians. Scatter detectors 24 can be positioned between pencil beams 34 and fan beam 32 to ensure that only scattered radiation from the former and not the latter is detected. For example, secondary collimator 20 is configured to absorb scattered radiation (not shown) that is not parallel to the direction of scattered radiation 36. Further, although, in the exemplary embodiment, secondary collimator 20 and scatter detectors 24 are positioned on one side of pencil beams 34 with respect to the z-axis, in alternative embodiments secondary collimator 20 and scatter detectors 24 may be positioned on the other side, or on both sides, of pencil beams 34 with respect to the z-axis.

In the exemplary embodiment, transmission detectors 22 are charge integration detectors, while scatter detectors 24 are pulse-counting energy-resolving detectors. Transmission detectors 22 and each scatter detector 24 are in electronic communication with a number of channels 110, for example, N number of channels $C_1, \ldots C_N$, wherein N is selected based on the configuration of security detection system 10. Channels 110 electronically communicate data collected by transmission detectors 22 and each scatter detector 24 to a data processing system 112. In the exemplary embodiment, data processing system 112 combines an output from transmission detectors 22 and an output from scatter detectors 24 to generate information about the contents of examination area 14. For example, but not by way of limitation, data processing system 112 may generate multiview projections and/or section images of a container (not shown) in examination area 14 that identify a location in the container of specific materials detected by XDI analysis.

In the exemplary embodiment, data processing system 112 includes a processor 114 in electrical communication with transmission detectors 22 and scatter detectors 24. Processor 114 is configured to receive from scatter detectors 24 output signals representative of the detected x-ray quanta and generate a distribution of momentum transfer values, x, from a spectrum of energy, E, of x-ray quanta within scattered radiation detected by scatter detectors 24. As used herein, the term processor is not limited to just those integrated circuits referred to in the art as a processor, but broadly refers to a computer, a microcontroller, a microcomputer, a programmable logic controller, an application specific integrated circuit, and any other suitable programmable circuit. The computer may include a device, such as a floppy disk drive or CD-ROM drive, for reading data from a computer-readable medium, such as a floppy disk, a compact disc-read only memory (CD-ROM), a magneto-optical disk (MOD), or a digital versatile disc (DVD). In alternative embodiments, processor 114 executes instructions stored in firmware.

Figure 2:
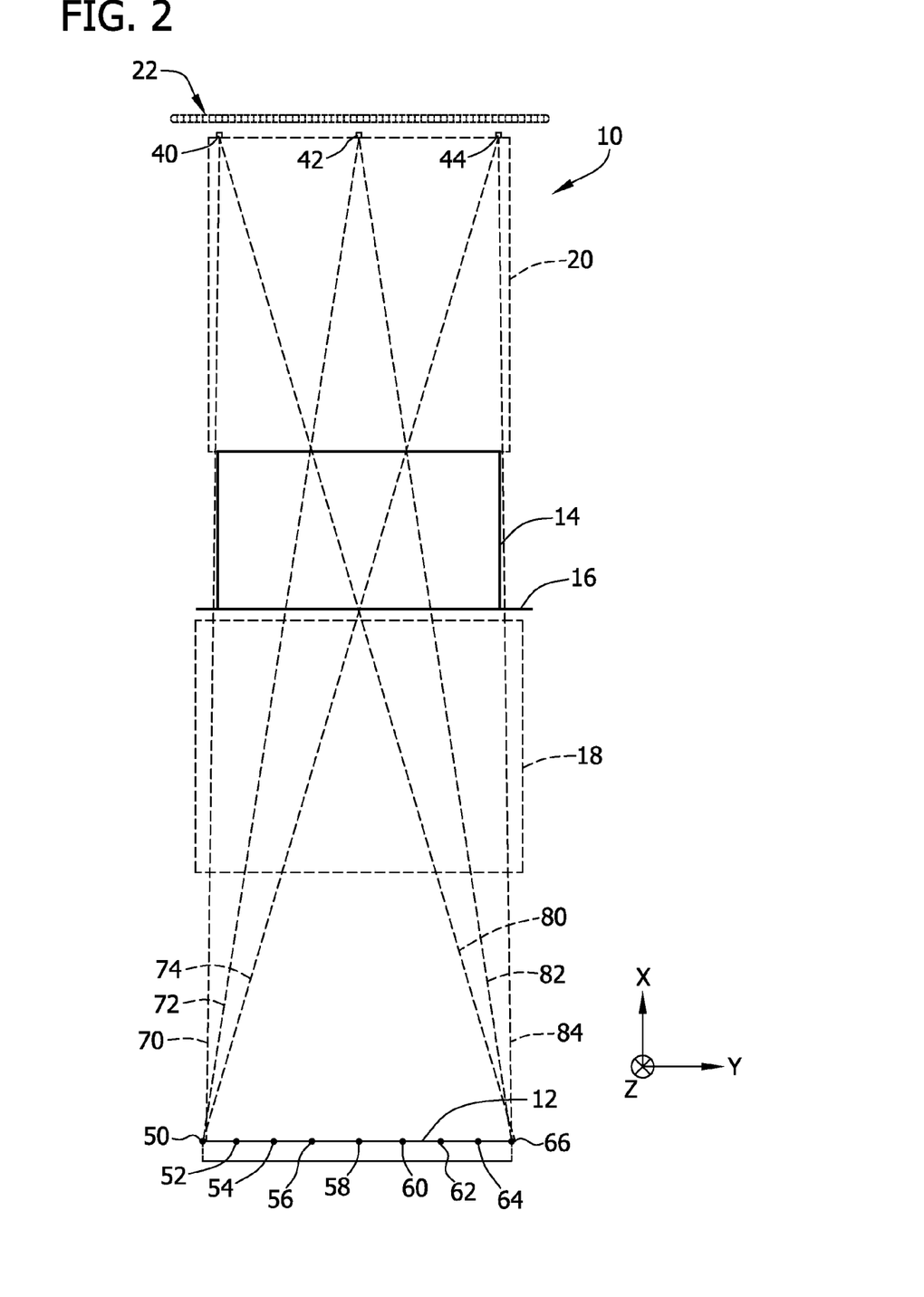
FIG. 2 is a schematic view, in an X-Y plane, of the security detection system shown in FIG. 1.

FIG. 2 is a schematic view, in an X-Y plane, of security detection system 10 shown in FIG. 1. With reference to FIGS. 1 and 2, in the exemplary embodiment, scatter detectors 24 include three discrete coherent x-ray scatter detectors 40, 42 and 44. Scatter detectors 40, 42 and 44 share identical x-coordinate values and z-coordinates values and are spaced apart in a direction substantially parallel to the y-axis. Moreover, in the exemplary embodiment, each set of pencil beams 34 generated by MFXS 12 includes three pencil beams corresponding to the number (three) of scatter detectors 40, 42 and 44. In alternative embodiments, a different number of scatter detectors and corresponding different number of pencil beams may be used.

As previously described, MFXS 12 includes a plurality of focus points, of which focus points 50, 52, 54, 56, 58, 60, 62, 64 and 66 are shown in FIG. 2. MFXS 12 is capable of sequentially generating both a fan beam 32 and, through MAPC 18, a set of pencil beams 34 from each focus point such as focus point 50, 52, 54, 56, 58, 60, 62, 64 and 66. Each pencil beam 34 is converged at a convergence point 35 associated with a corresponding scatter detector 40, 42 or 44. For example, the set of pencil beams 34 generated from focus point 50 includes pencil beam 70, pencil beam 72 and pencil beam 74. Scattered radiation 36 having a component with an angle θ in the X-Z plane, shown in FIG. 1, from pencil beam 70 is received by scatter detector 40, scattered radiation 36 from pencil beam 72 is received by scatter detector 42, and scattered radiation 36 from pencil beam 74 is received by scatter detector 44 respectively. For another example, the set of pencil beams 34 generated from focus point 66 includes pencil beam 80, pencil beam 82 and pencil beam 84. Scattered radiation 36 having a component with an angle θ in the X-Z plane, from pencil beam 80 is received by scatter detector 40, scattered radiation 36 from pencil beam 82 is received by scatter detector 42, and scattered radiation 36 from pencil beam 84 is received by scatter detector 44, respectively.

In addition, each fan beam 32 generated sequentially from each focus point of MFXS 12, such as focus point 50, 52, 54, 56, 58, 60, 62, 64 and 66, is recorded at transmission detectors 22. Transmission detectors 22 extend in a direction substantially parallel to the y-axis. Transmission detectors 22 typically receive radiation from each fan beam 32 after fan beam 32 is attenuated by a container (not shown) positioned in examination area 14. In the exemplary embodiment, transmission detectors 22 are dual energy transmission detectors. In certain embodiments, the array of transmission detectors 22 includes approximately 1000 detector elements or modules.

In the exemplary embodiment, security detection system 10 is configured to operate such that focus point 50, the focus point at a first end of MFXS 12 relative to the y-direction, first simultaneously generates both fan beam 32 and a set of pencil beams 34 for which data is collected from transmission detectors 22 and scatter detectors 40, 42 and 44, respectively, and electronically communicated to data processing system 112. Then, focus point 52, the focus point of MFXS 12 adjacent focus point 50 in the y-direction, simultaneously generates both fan beam 32 and a set of pencil beams 34 for which data is collected from transmission detectors 22 and scatter detectors 40, 42 and 44, respectively, and electronically communicated to data processing system 112. The remaining focus points 54, 56, 58, 60, 62, 64 and 66, in sequence along the y-direction, likewise simultaneously generate both fan beam 32 and a set of pencil beams 34 for which data is collected from transmission detectors 22 and scatter detectors 40, 42 and 44, respectively, and electronically communicated to data processing system 112. Security detection system 10 then repeats the sequence starting with focus point 50 again. In certain embodiments, the container under examination (not shown) moves in the z-direction relative to MFXS 12 at a speed that is relatively slow compared to a speed at which MFXS 12 switches among focus points.

In alternative embodiments, the focus points of MFXS 12 generate fan beam 32 and a set of pencil beams 34 in a sequence that is not based upon their relative position along the y-direction. In an exemplary embodiment for checkpoint or "carry-on" luggage screening, the array of transmission detectors 22 has a length parallel to the y-axis of approximately 650 mm, and scatter detectors 24 are spaced sequentially at approximately 250 mm intervals in a direction substantially parallel to the y-axis. Each transmission detector 22 and scatter detector 24 is located approximately 1500 mm from MFXS 12 in a direction substantially parallel to the x-axis. In an exemplary embodiment for checked luggage screening, the array of transmission detectors 22 has a length parallel to the y-axis of approximately 2000 mm, and scatter detectors 24 are spaced sequentially at approximately 50 mm intervals in a direction substantially parallel to the y-axis. Each transmission detector 22 and each scatter detector 24 is located approximately 2000 mm from MFXS 12 in a direction substantially parallel to the x-axis. In alternative embodiments, other suitable dimensions are used that allow all desired portions of examination area 14 to be covered for both XDI analysis and multiview transmission imaging.

Figure 3:
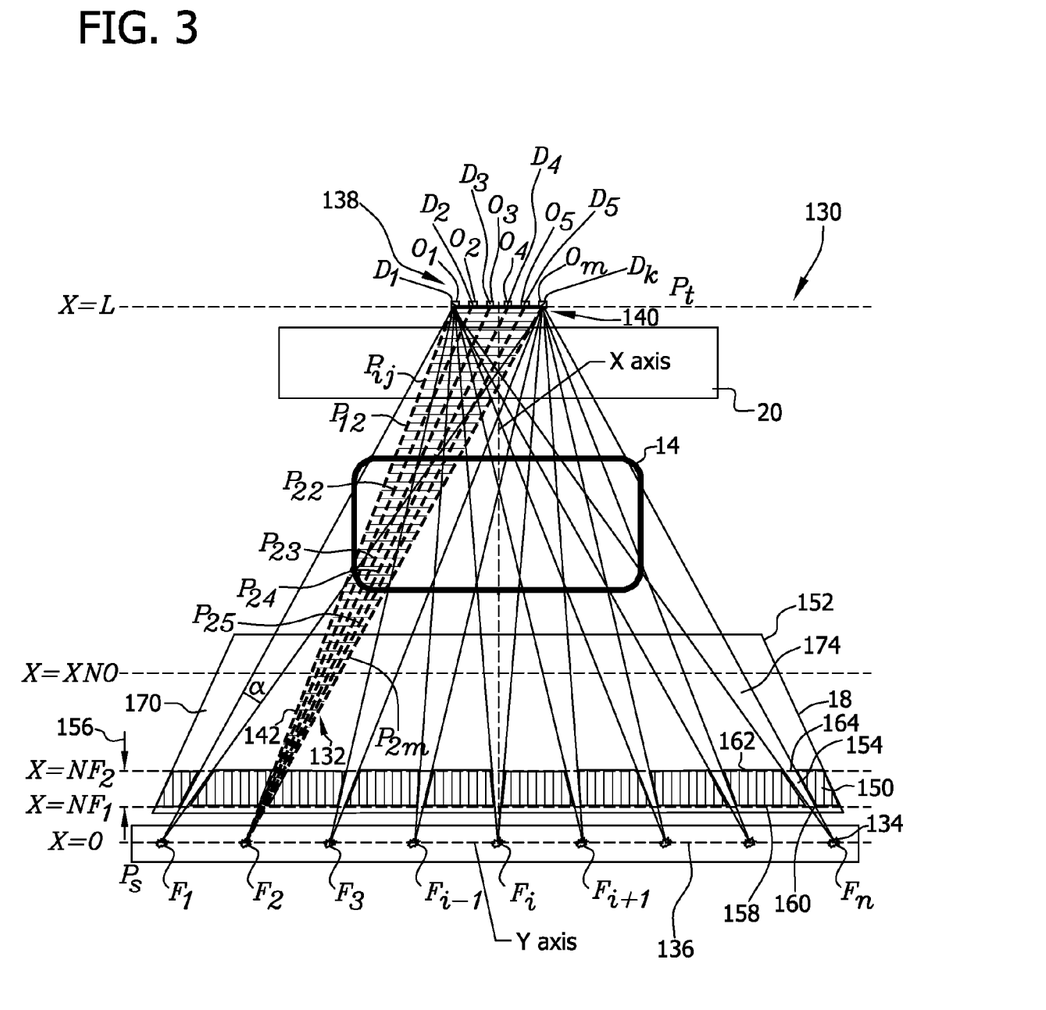
FIG. 3 is a schematic view, in an X-Z plane, of an alternative exemplary security detection system.

FIG. 3 is a schematic view, in an X-Z plane, of an alternative exemplary security detection system 130. Referring further to FIG. 3, in one embodiment, a multi-detector inverse fan beam (MIFB) 132 is projected along the z-axis. In one embodiment, MFXS 12 emits radiation sequentially from a plurality of focus points 134. More specifically, MFXS 12 includes an anode 136 and a plurality of focus points 134 arranged along a length of anode 136 collinear with a y-axis of MFXS 12. Each focus point 134 is sequentially activated to emit an x-ray fan beam, such as MIFB 132 including a plurality of pencil primary beams. Focus points 134 are denoted $F_1, F_2, \ldots F_i, \ldots F_n$ with a running index i. MAPC 18 is configured to select from the radiation emitted at each focus point 134, primary beams that are directed to a series of convergence points 138 labeled $O_1, O_2, \ldots, O_j, \ldots O_m$ with a running index j regardless of which focus point 134 is activated. Six primary beams are shown in FIG. 3 with each primary beam emitted from focus point $F_2$ directed to a corresponding convergence point $O_1, O_2, O_3, O_4, O_5$, and $O_m$ positioned along a line parallel to the y-axis at a coordinate X=L with one focus point $F_2$ activated.

A plurality of discrete coherent x-ray scatter detectors 140 labeled discrete coherent x-ray scatter detectors $D_1, D_2, \ldots D_j, \ldots D_k$ with a running index j are positioned at a suitable or desirable distance in a direction along the z-axis from a corresponding convergence point 138 to record coherent scatter at an angle θ from primary beam $P_{ij}$ in discrete coherent x-ray scatter detector $D_j$. In one embodiment, this distance is about 30 mm for a scatter angle of about 0.037 radians at a distance of about 750 mm between a scatter center and a corresponding coherent scatter detector $D_j$. A combination of the MFXS and the discrete coherent x-ray scatter detectors facilitates examining a volume of an object positioned within examination area without any dead area from which no XDI signal is detected or measured.

As a primary beam 142 labeled $P_{ij}$ propagates through an object (not shown) positioned within examination area 14, primary beam $P_{ij}$ interacts with the object to produce coherent scatter that may be detected in coherent scatter detectors $D_{j+1}$, $D_{j+2}$, $D_{j-1}$, and/or $D_{j-2}$, for example. As shown in FIG. 3, primary beams $P_{21}$, $P_{22}$, $P_{23}$, $P_{24}$, $P_{25}$, and $P_{2m}$ are emitted from focus point $F_2$ and directed to corresponding convergence points $O_1$, $O_2$, $O_3$, $O_4$, $O_5$, and $O_m$, respectively. As each primary beam $P_{21}$, $P_{22}$, $P_{23}$, $P_{24}$, $P_{25}$, and $P_{2m}$ moves through examination area 14, each primary beam $P_{21}$, $P_{22}$, $P_{23}$, $P_{24}$, $P_{25}$, and $P_{2m}$ collides with and/or interacts with an object (not shown) positioned within examination area 14 to produce coherent scatter (not shown) that is detectable at one or more coherent scatter detectors $D_1$, $D_2$, $D_3$, $D_4$, $D_5$, and/or $D_k$, for example.

In one embodiment, MFXS 12 is positioned on the y-axis (x=0) of a Cartesian coordinate system. Each focus point 134 has a position on a grid having a pitch, $P_s$. Further, convergence points 138 lie parallel to the y-axis at coordinate X=L, and each convergence point 138 has a position on a grid having a pitch, $P_t$. In a particular embodiment, for an XDI checked baggage screening system, L=2000 millimeters (mm), $P_s$=50 mm and $P_t$=40 mm. In this embodiment, a plurality of scatter detectors 140 are positioned at the same y-coordinate as convergence points 138. One pair of scatter detectors 140 may be associated with a corresponding convergence point 138 with the pair of scatter detectors 140 positioned on both sides of the X-Y plane. In a further embodiment, thirteen (13) convergence points are used to allow for several convergence point position arrangements to incorporate a different number of scatter detectors 140. If all convergence points 138 have detector pairs then security detection system 130 may include twenty-six (26) scatter detectors 140. In alternative embodiments, few scatter detectors 140 may be positioned at convergence point positions 1, 3, 5, 7, 9, 11 and 13; or at convergence point positions 1, 4, 7, 10 and 13; or at convergence point positions 1, 5, 9 and 13 to account for manufacturing and/or cost constraints. An MIFB configuration including 13 convergence points requires a fan angle from each focus point 134 of about 14° in the y-direction.

As described above, MAPC 18 is configured to select from the radiation emitted at each focus point 134, primary beams that are directed to a series of convergence points 138 labeled $O_1$, $O_2$, ... $O_j$, ... $O_m$ with a running index j regardless of which focus point 134 is activated. Six primary beams are shown in FIG. 3 with each primary beam emitted from each focus point 134 and having an angular range such that each primary beam is directed to a corresponding convergence point 138. MAPC 18 includes a first or near-focus diaphragm 150 positioned within a primary collimator housing 152 and configured to be positioned with respect to MFXS 12. Near-focus diaphragm 150 defines a plurality of first channels 154 through a thickness of near-focus diaphragm 150. Each first channel 154 is aligned with a corresponding focus point 134 and is configured to transmit MIFB 132 including primary beams 142 directed to a corresponding convergence point 138. In one embodiment, near-focus diaphragm 150 is configured to isolate from each focus point a fan of radiation in the X-Y plane having a fan angle, α, sufficient to irradiate the plurality of convergence points 138. In a particular embodiment, fan angle α in the y-direction is not greater than about 60° and, more particularly, fan angle α in the y-direction is about 5° to about 50° to irradiate up to about 150 convergence points 138 and, more particularly, about three (3) to about 129 convergence points 138.

In the exemplary embodiment, a thickness 156 of near-focus diaphragm 150 along the x-axis perpendicular to the y-axis between a first surface 158 of near-focus diaphragm 150 at a first point $NF_1$ defining an entrance opening 160 of each first channel 154 and a second surface 162 of near-focus diaphragm 150 at a second point $NF_2$ defining an exit opening 164 of each first channel 154 satisfies the following equation:

$$NF_2 \cong \left(1 + \frac{W}{P_s}\right) \cdot NF_1, \quad \text{Eq. 1}$$

wherein exit opening 164 has a width W and each focus point 134 has a pitch $P_s$. Inserting typical values of these parameters, with $NF_1$=150 mm, $P_s$=50 mm, and W=4 mm, Equation 1 yields that $NF_2 \gtrsim 162$ mm. Hence, near-focus diaphragm 150 should have a thickness of at least about 12 mm in the x-direction in this embodiment.

MAPC 18 also includes a second or near-object diaphragm 170 positioned within primary collimator housing 152 and with respect to first diaphragm 150. Near-object diaphragm 170 defines a plurality of second channels 174 through a thickness of near-object diaphragm 170. Each second channel 174 is axially aligned with a corresponding first channel 154. Near-object diaphragm 170 is configured to select several discrete primary beams 142 each directed to a corresponding convergence point 138 from MIFB 132 transmitted by near-focus diaphragm 150. Moreover, near-object diaphragm 170 ensures that the discrete primary beams 142 are precisely directed to corresponding convergence point 138, irrespective of which focus point 134 in MFXS 12 is activated. This imposes a geometrical condition on a location in the x-direction of near-object diaphragm 170, as described below. Further, near-object diaphragm 170 is configured to direct each primary beam 142 at corresponding convergence point 138 with each focus point 134 activated.

Referring to FIG. 3, it is assumed that near-object diaphragm 170 has a transmission profile described by a comb function, having a value unity at open channels, which lie on a regular grid having a pitch $P_c$, and zero elsewhere. In one embodiment, near-object diaphragm 170 projects a plurality of first primary beams (not shown) from a first focus point $F_i$ onto corresponding convergence points 138 at X=L. Similarly, near-object diaphragm 170 projects a plurality of second primary beams, such as primary beams 142, from a second focus point $F_{i+1}$ adjacent first focus point $F_i$ onto convergence points 138. In this embodiment, in order that primary beams 142 from second focus point $F_{i+1}$ transmitted by near-object diaphragm 170 are in register with the first primary beams from first focus point $F_i$, i.e., primary beams 142 arrive at each convergence point 138 to which the first primary beams are directed, near-object diaphragm 170 has a position XNO along the x-axis perpendicular to the y-axis according to the following equation:

$$XNO = \frac{L}{1 + \frac{N \cdot P_t}{P_s}}, \quad \text{Eq. 2}$$

wherein N is a positive integer, each convergence point 138 has a pitch $P_t$, each focus point 134 has a pitch $P_s$, and the plurality of second primary beams arrive at the same convergence points to which the plurality of first primary beams are directed.

Referring to Equation 2, with N=1, one primary beam of the plurality of first primary beams from first focus point $F_i$ transmitted through a corresponding second channel 174 to a first convergence point $O_j$ is displaced to a second convergence point $O_{j-1}$ for corresponding second channel 174 with second focus point $F_{i+1}$ activated. With N=2, one primary beam of the plurality of first primary beams from first focus point $F_i$ transmitted through a corresponding second channel 174 to first convergence point $O_j$ is displaced to a second convergence point $O_{j-2}$ for corresponding second channel 174 with second focus point $F_{i+1}$ activated. As a result, the plurality of primary beams from the plurality of focus points are replicated at corresponding convergence points with each focus point activated.

It is evident from Equation 2 that XNO decreases as N increases. Using values for dimensions given above, values of XNO for several values of the parameter N are reproduced in Table 1.

TABLE 1

| XNO | 1111.11 | 769.23 | 588.24 | 476.19 |
|---|---|---|---|---|
| N | 1 | 2 | 3 | 4 |

When Equation 2 is satisfied, the primary beams from all focus points are replicated at identical convergence points, irrespective of the focus point position. For this reason, Equation 2 is termed the "replicacy condition." A channel pitch and a channel width of near-object diaphragm 170 can be determined by noting that any active focus point magnifies near-object diaphragm 170 by a factor L/XNO onto convergence points in a plane at X=L. Hence, near-object diaphragm 170 is completely defined using the results as described above.

Figure 4:
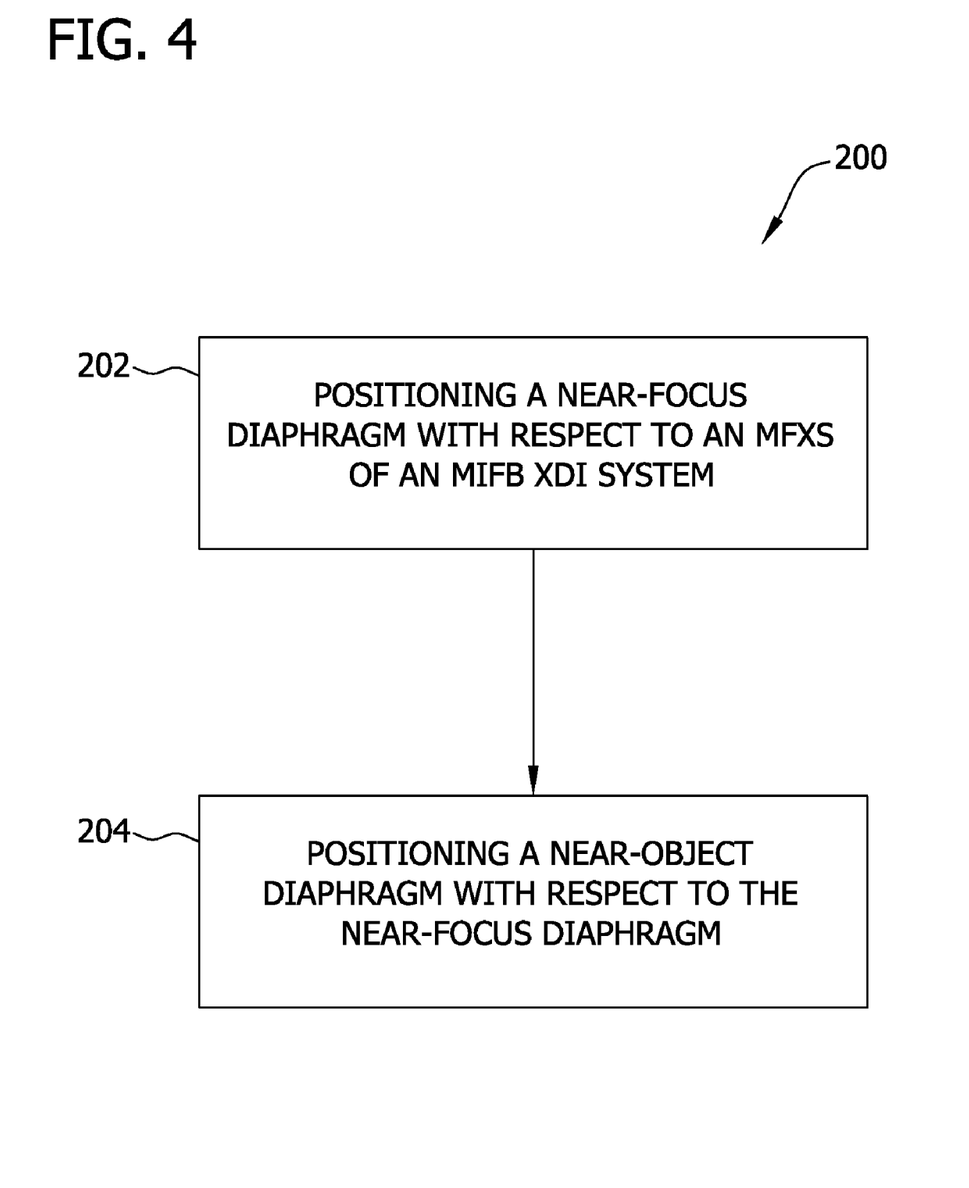
FIG. 4 is a flowchart of an exemplary method for manufacturing or fabricating a primary collimator suitable for use with the security detection systems shown in FIGS. 1-3.

Referring to FIG. 4, in one embodiment, a method 200 for manufacturing or fabricating a primary collimator for an MIFB XDI system including an MFXS that defines a plurality of focus points arranged along a length of the MFXS collinear with a y-axis of the MIFB XDI system is provided. Each focus point is sequentially activated to emit an x-ray fan beam including a plurality of primary beams each directed to a corresponding convergence point positioned along a line parallel to the y-axis at a coordinate X=L.

A first or near-focus diaphragm is positioned 202 with respect to the MFXS. The near-focus diaphragm defines a plurality of first channels through a thickness of the near-focus diaphragm. Each first channel is aligned with a corresponding focus point and configured to transmit the x-ray fan beam. The near-focus diaphragm is formed having a thickness along an x-axis perpendicular to the y-axis between a first surface of the near-focus diaphragm at a first point $NF_1$ defining an entrance opening of each first channel and a second surface of the near-focus diaphragm at a second point $NF_2$ defining an exit opening of each first channel that satisfies Equation 1, wherein the exit opening has a width W and each focus point has a pitch $P_s$.

A second or near-object diaphragm is positioned 204 with respect to the near-focus diaphragm. The near-object diaphragm defines a plurality of second channels through a thickness of the near-object diaphragm. Each second channel is axially aligned with a corresponding first channel. The near-object diaphragm projects a plurality of first primary beams from a first focus point $F_i$ of the plurality of focus points onto the plurality of convergence points at X=L, and the second diaphragm projects a plurality of second primary beams from a second focus point $F_{i+1}$ adjacent the first focus point onto the plurality of convergence points. In this embodiment, the near-object diaphragm is positioned with respect to the near-focus diaphragm at a position XNO along an x-axis perpendicular to the y-axis that satisfies Equation 2, wherein N is a positive integer, each convergence point has a pitch $P_r$, each focus point has a pitch $P_s$, and the plurality of second primary beams are in register with the plurality of first primary beams, i.e., the second primary beams arrive at each convergence point 138 to which the first primary beams are directed.

The above-described MIFB XDI system includes a primary collimator that only transmits x-rays directed to a finite number of convergence points. The primary collimator has a first or near-focus diaphragm that defines a plurality of first channels through the near-focus diaphragm and a cooperating second or near-object diaphragm that defines a plurality of second channels through the near-object diaphragm, each of which are axially aligned with a corresponding first channel. Because the primary collimator includes only two diaphragms, the primary collimator is mechanically and operationally simpler, as well as less expensive to fabricate and more precise than conventional primary collimators. In one embodiment, the near focus diaphragm selects from a cone of radiation emitted by each focus point on the MFXS an angular range sufficient to generate a multiple fan beam and the near-object diaphragm satisfies a simple replicacy condition.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A primary collimator for a multiple inverse fan beam x-ray diffraction imaging (MIFB XDI) system including a multi-focus x-ray source (MFXS) defining a plurality of focus points arranged along a length of the MFXS colinear with a y-axis of the MIFB XDI system, each focus point of the plurality of focus points configured to be activated to emit an x-ray fan beam including a plurality of primary beams each directed to a corresponding convergence point of a plurality of convergence points positioned along a line parallel to the y-axis at a coordinate X=L, said primary collimator comprising:

a first diaphragm configured to be positioned with respect to the MFXS, said first diaphragm defining a plurality of first channels through a thickness of said first diaphragm, each first channel of said plurality of first channels aligned with a corresponding focus point of the plurality of focus points and configured to transmit the x-ray fan beam;

a second diaphragm positioned with respect to said first diaphragm and defining a plurality of second channels through a thickness of said second diaphragm, each second channel of said plurality of second channels axially aligned with a corresponding first channel of said plurality of first channels; and a plurality of coherent scatter detectors positioned with respect to the plurality of convergence points and configured to detect coherent scatter rays from the plurality of primary beams as the plurality of primary beams propagate through an object.

2. A primary collimator for an MIFB XDI system in accordance with claim 1, wherein said first diaphragm is configured to transmit the x-ray fan beam including the plurality of primary beams having an angular range such that each primary beam of the plurality of primary beams is directed to the corresponding convergence point.

3. A primary collimator for an MIFB XDI system in accordance with claim 1, wherein a thickness of said first diaphragm along an x-axis perpendicular to the y-axis between a first surface of said first diaphragm defining an entrance opening of each first channel at a first point $NF_1$ and a second surface of said first diaphragm at a second point $NF_2$ defining an exit opening of each first channel satisfies the following equation:

$$NF_2 \cong \left(1 + \frac{W}{P_s}\right) \cdot NF_1,$$

wherein said exit opening has a width W and each focus point has a pitch Ps.

4. A primary collimator for an MIFB XDI in accordance with claim 1, wherein said second diaphragm is configured to select the plurality of primary beams each directed to the corresponding convergence point from the x-ray fan beam transmitted by said first diaphragm.

5. A primary collimator for an MIFB XDI system in accordance with claim 1, wherein said second diaphragm is configured to direct each primary beam of the plurality of primary beams at the corresponding convergence point with each focus point activated.

6. A primary collimator for an MIFB XDI system in accordance with claim 1, wherein said second diaphragm projects a plurality of first primary beams from a first focus point $F_i$ of the plurality of focus points onto the plurality of convergence points at X=L, and said second diaphragm projects a plurality of second primary beams from a second focus point $F_{i+1}$ adjacent the first focus point onto the plurality of convergence points, wherein said second diaphragm has a position XNO along an x-axis perpendicular to the y-axis:

$$XNO = \frac{L}{1 + \frac{N \cdot P_t}{P_s}},$$

wherein N is a positive integer, each convergence point of the plurality of convergence points has a pitch $P_t$, each focus point has a pitch $P_s$, and the plurality of second primary beams arrive at each convergence point to which the plurality of first primary beams are directed.

7. A primary collimator for an MIFB XDI system in accordance with claim 6, with N=1, one primary beam of the plurality of first primary beams from the first focus point $F_i$ through a corresponding second channel of said plurality of second channels to a first convergence point $O_j$ of the plurality of convergence points is displaced to a second convergence point $O_{j-1}$ of the plurality of convergence points for the corresponding second channel with the second focus point $F_{i+1}$ activated.

8. A primary collimator for an MIFB XDI system in accordance with claim 6, with N=2, one primary beam of the plurality of first primary beams from the first focus point $F_i$ through a corresponding second channel of said plurality of second channels to a first convergence point $O_j$ of the plurality of convergence points is displaced to a second convergence point $O_{j-2}$ of the plurality of convergence points for the corresponding second channel with the second focus point $F_{i+1}$ activated.

9. A multiple inverse fan beam x-ray diffraction imaging (MIFB XDI) system, comprising:
a multi-focus x-ray source (MFXS) comprising an anode and a plurality of focus points arranged along a length of the anode colinear with a y-axis of said MFXS, each focus point of the plurality of focus points configured to be activated to emit an x-ray fan beam including a plurality of primary beams;
a multi-angle primary collimator (MAPC) configured to select the plurality of primary beams each directed to a corresponding convergence point of a plurality of convergence points positioned along a line parallel to the y-axis at a coordinate X=L with one focus point of the plurality of focus points activated; and
a plurality of coherent scatter detectors positioned with respect to the plurality of convergence points and configured to detect coherent scatter rays from the plurality of primary beams as the plurality of primary beams propagate through an object.

10. An MIFB XDI system in accordance with claim 9, wherein said MAPC comprises a first diaphragm configured to isolate from each focus point the x-ray fan beam in an X-Y plane having a fan angle sufficient to irradiate the plurality of convergence points.

11. An MIFB XDI system in accordance with claim 10, wherein the MIFB XDI system comprises a plurality of convergence points requiring said fan angle in the y-direction of not greater than about 60°.

12. An MIFB XDI system in accordance with claim 10, wherein a thickness of said first diaphragm along an x-axis perpendicular to the y-axis between a first surface of said first diaphragm defining an entrance opening of each first channel at a first point $NF_1$ and a second surface of said first diaphragm at a second point $NF_2$ defining an exit opening of each first channel satisfies the following equation:

$$NF_2 \cong \left(1 + \frac{W}{P_s}\right) \cdot NF_1,$$

wherein said exit opening has a width W and each focus point has a pitch $P_s$.

13. An MIFB XDI system in accordance with claim 10, wherein a second diaphragm is configured to select from the x-ray fan beam transmitted by said first diaphragm a plurality of primary beams each directed to the corresponding convergence point.

14. An MIFB XDI system in accordance with claim 13, wherein said second diaphragm is configured to direct each primary beam of a plurality of primary beams at the corresponding convergence point with each focus point activated.

15. An MIFB XDI system in accordance with claim 13, wherein said second diaphragm projects a plurality of first primary beams from a first focus point $F_i$ of the plurality of focus points onto the plurality of convergence points at X=L, and said second diaphragm projects a plurality of second primary beams from a second focus point $F_{i+1}$ adjacent the first focus point onto the plurality of convergence points, wherein said second diaphragm has a position XNO along an x-axis perpendicular to the y-axis:

$$XNO = \frac{L}{1 + \frac{N \cdot P_t}{P_s}},$$

wherein N is a positive integer, each convergence point of the plurality of convergence points has a pitch $P_t$, each focus point has a pitch $P_s$, and the plurality of second primary beams arrive at each convergence point to which the plurality of first primary beams are directed.

16. An MIFB XDI system in accordance with claim 9, further comprising an examination area to position the object.

17. An MIFB XDI system in accordance with claim 9, wherein said plurality of coherent scatter detectors positioned with respect to the plurality of convergence points comprises a pair of coherent scatter detectors associated with the corresponding convergence point, and each coherent scatter detector of said pair of coherent scatter detectors lies parallel to the y-axis at the coordinate X=L.

18. A method for fabricating a primary collimator for a multiple inverse fan beam x-ray diffraction imaging (MIFB XDI) system including a multi-focus x-ray source (MFXS) defining a plurality of focus points arranged along a length of the MFXS colinear with a y-axis of the MIFB XDI system, each focus point of the plurality of focus points activated to emit an x-ray fan beam including a plurality of primary beams each directed to a corresponding convergence point of a plurality of convergence points positioned along a line parallel to the y-axis at a coordinate X=L, said method comprising:

positioning a first diaphragm with respect to the MFXS, the first diaphragm defining a plurality of first channels through a thickness of the first diaphragm, each first channel of the plurality of first channels aligned with a corresponding focus point of the plurality of focus points and configured to transmit the x-ray fan beam;

positioning a second diaphragm with respect to the first diaphragm, the second diaphragm defining a plurality of second channels through a thickness of the second diaphragm, each second channel of the plurality of second channels axially aligned with a corresponding first channel of the plurality of first channels; and positioning a plurality of coherent scatter detectors with respect to the plurality of convergence points, the plurality of coherent scatter detectors configured to detect coherent scatter rays from the plurality of primary beams as the plurality of primary beams propagate through an object positioned within an examination area.

19. A method in accordance with claim 18, further comprising forming the first diaphragm having a thickness along an x-axis perpendicular to the y-axis between a first surface of the first diaphragm defining an entrance opening of each first channel at a first point $NF_1$ and a second surface of the first diaphragm at a second point $NF_2$ defining an exit opening of each first channel that satisfies the following equation:

$$NF_2 \cong \left(1 + \frac{W}{P_s}\right) \cdot NF_1,$$

wherein the exit opening has a width W and each focus point has a pitch $P_s$.

20. A method in accordance with claim 18, wherein the second diaphragm projects a plurality of first primary beams from a first focus point Fi of the plurality of focus points onto the plurality of convergence points at X=L, and the second diaphragm projects a plurality of second primary beams from a second focus point $F_{i+1}$ adjacent the first focus point onto the plurality of convergence points, said positioning a second diaphragm with respect to the first diaphragm further comprises positioning the second diaphragm at a position XNO along an x-axis perpendicular to the y-axis:

$$XNO = \frac{L}{1 + \frac{N \cdot P_t}{P_s}},$$

wherein N is a positive integer, each convergence point of the plurality of convergence points has a pitch $P_t$, each focus point has a pitch $P_s$, and the plurality of second primary beams arrive at each convergence point to which the plurality of first primary beams are directed.

* * * * *